(12) United States Patent
Scofield

(10) Patent No.: US 9,285,587 B2
(45) Date of Patent: Mar. 15, 2016

(54) WINDOW-ORIENTED DISPLAYS FOR TRAVEL USER INTERFACES

(71) Applicant: INRIX, Inc., Kirkland, WA (US)

(72) Inventor: Christopher L. Scofield, Seattle, WA (US)

(73) Assignee: INRIX, Inc., Kirkland, WA (US)

( * ) Notice: Subject to any disclaimer, the term of this patent is extended or adjusted under 35 U.S.C. 154(b) by 0 days.

(21) Appl. No.: 13/839,654

(22) Filed: Mar. 15, 2013

(65) Prior Publication Data

US 2014/0278033 A1 Sep. 18, 2014

(51) Int. Cl.

| | |
|---|---|
| *G02B 27/01* | (2006.01) |
| *G06F 3/01* | (2006.01) |
| *G08G 1/0967* | (2006.01) |
| *G01C 21/36* | (2006.01) |
| *G01C 21/34* | (2006.01) |

(52) U.S. Cl.
CPC ............ *G02B 27/01* (2013.01); *G01C 21/3697* (2013.01); *G06F 3/013* (2013.01); *G06F 3/014* (2013.01); *G06F 3/017* (2013.01); *G08G 1/09675* (2013.01); *G01C 21/3415* (2013.01)

(58) Field of Classification Search
CPC ......... B60R 1/00; B60R 1/001; B60W 50/14; B62D 15/02; G05D 1/0246; G06K 9/00791; G01C 21/36; G01C 21/3697; G08G 1/096827; G08G 1/09675; G02B 27/01; G06F 3/013; G06F 3/014
USPC .................. 701/400, 425, 426, 439; 345/7–9; 359/630–633
See application file for complete search history.

(56) References Cited

U.S. PATENT DOCUMENTS

| | | | |
|---|---|---|---|
| 6,321,158 B1* | 11/2001 | DeLorme et al. ............. | 701/426 |
| 2004/0212484 A1* | 10/2004 | Su et al. ........................ | 340/435 |
| 2010/0289632 A1* | 11/2010 | Seder et al. ................... | 340/436 |

(Continued)

FOREIGN PATENT DOCUMENTS

| | | |
|---|---|---|
| EP | 1378724 A1 | 1/2004 |
| EP | 1378724 B1 * | 3/2006 |
| JP | H07280579 A * | 10/1995 |

OTHER PUBLICATIONS

Int. Search Report cited in PCT Application No. PCT/US2014/022564 dated Aug. 13, 2014, 11 pgs.

*Primary Examiner* — Rodney Butler
(74) *Attorney, Agent, or Firm* — Cooper Legal Group, LLC

(57) ABSTRACT

Vehicular travel may be facilitated by user interfaces presenting travel information. Such user interfaces often involve visual displays positioned peripherally to a window through which an individual operates the vehicle (e.g., displays mounted in a dash or console) and/or non-visual interfaces (e.g., audio, speech recognition, and manual controls). While presenting visuals on the window obscuring the view of the individual may present safety concerns, peripherally presented visual interfaces that distract the gaze of the individual may raise comparable or greater concerns. Instead, visual user interfaces may be displayed on the window through which the individual operates the vehicle (e.g., a windshield or individual eyewear) to presents visuals representing travel information received from a travel service, such as routing, traffic congestion, highlighting vehicles or routes, and rendering non-visible objects (e.g., obscured traffic control signals). Such user interfaces enable user interaction while allowing the individual to maintain gaze through the window.

18 Claims, 7 Drawing Sheets

(56) References Cited

U.S. PATENT DOCUMENTS

| | | |
|---|---|---|
| 2010/0292886 A1 | 11/2010 | Szczerba et al. |
| 2011/0093190 A1* | 4/2011 | Yoon .............................. 701/201 |
| 2011/0231182 A1* | 9/2011 | Weider et al. ..................... 704/9 |
| 2012/0173069 A1* | 7/2012 | Tsimhoni et al. ............... 701/25 |
| 2012/0303274 A1* | 11/2012 | Su et al. ......................... 701/533 |
| 2013/0009993 A1* | 1/2013 | Horseman ..................... 345/633 |
| 2013/0024108 A1* | 1/2013 | Grun ............................. 701/424 |

* cited by examiner

WINDOW-ORIENTED DISPLAYS FOR TRAVEL USER INTERFACES

BACKGROUND

Within the field of vehicle travel, many scenarios involve a user interface configured to present information to an individual operating the vehicle, such as a map of a travel region; indicators of locations on the map that may be of interest to the user; a route selected by the individual; navigation directions; and traffic congestion information. Such devices often communicate with remote services for up-to-date travel information, such as traffic conditions in the travel region and along the route of the individual.

However, significant problems may arise if the device obscures the vision of the individual or distracts the individual from the operation of the vehicle. Accordingly, the user interfaces of such devices are often designed to interact with the individual in a peripheral manner. As a first example, while the user is operating the vehicle while looking through a window, a device involving a display is often positioned peripheral to the window; e.g., portable devices are often positioned on or integrated with a dashboard or center console of the vehicle that the viewer may view with peripheral vision or a momentary glance. As a second example, many such devices are configured to interact with the individual in a non-visual manner for output (e.g., text-to-speech interfaces and tactile interfaces such as vibration) and for input (e.g., voice command interfaces and touch interfaces, such as dials that provide an audible or tactile click when manipulated).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While legitimate concerns may arise in the context of user interfaces presented to an individual during the operation of a vehicle, such concerns may not be fully satisfied by limiting such user interfaces to the periphery of the individual's attention. Such peripheral interaction may in fact exacerbate the distraction of the individual; e.g., momentary glances or interaction with devices positioned in the periphery of the individual's view may divert the individual's view through the window of the environment of the vehicle, and may dangerously slow the individual's reaction to urgent changes in travel conditions. Accordingly, it may be advantageous to integrate the user interfaces with the view of the individual through the window while operating the vehicle.

Presented herein are techniques for facilitating an individual in the operation of a vehicle while looking through a window, where such techniques involve displaying visuals on the window that present travel information received from a travel service. For example, a projector may project a visual display on the window of the vehicle, and/or a liquid crystal display (LCD) may be integrated with the window of the vehicle, and such devices may relay information to the individual as selectively positioned visuals on the window. The selective positioning may indicate and/or highlight objects viewable through the window; may supplement the view through the window with objects that are not visible (e.g., a significant traffic control device that is obscured by another vehicle); and/or may present visuals in peripheral areas of the window that are closer to the primary viewing area of the window than dash- or console-mounted displays. Additionally, the window-displayed user interface may be interactive in various ways; e.g., upon receiving user input from the individual that is associated with a visual, such as eye gaze at a gaze position near a selected visual and a focal depth that is focused on the window, the device may interpret the user input as a selection of the visual, and may supplement the presentation with additional information received from the travel service that is related to the selected visual. In this manner, the travel user interface integrated with the window through which the individual operates the vehicle may supplement, rather than obscure or distract from, the individual's safe operation of the vehicle in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
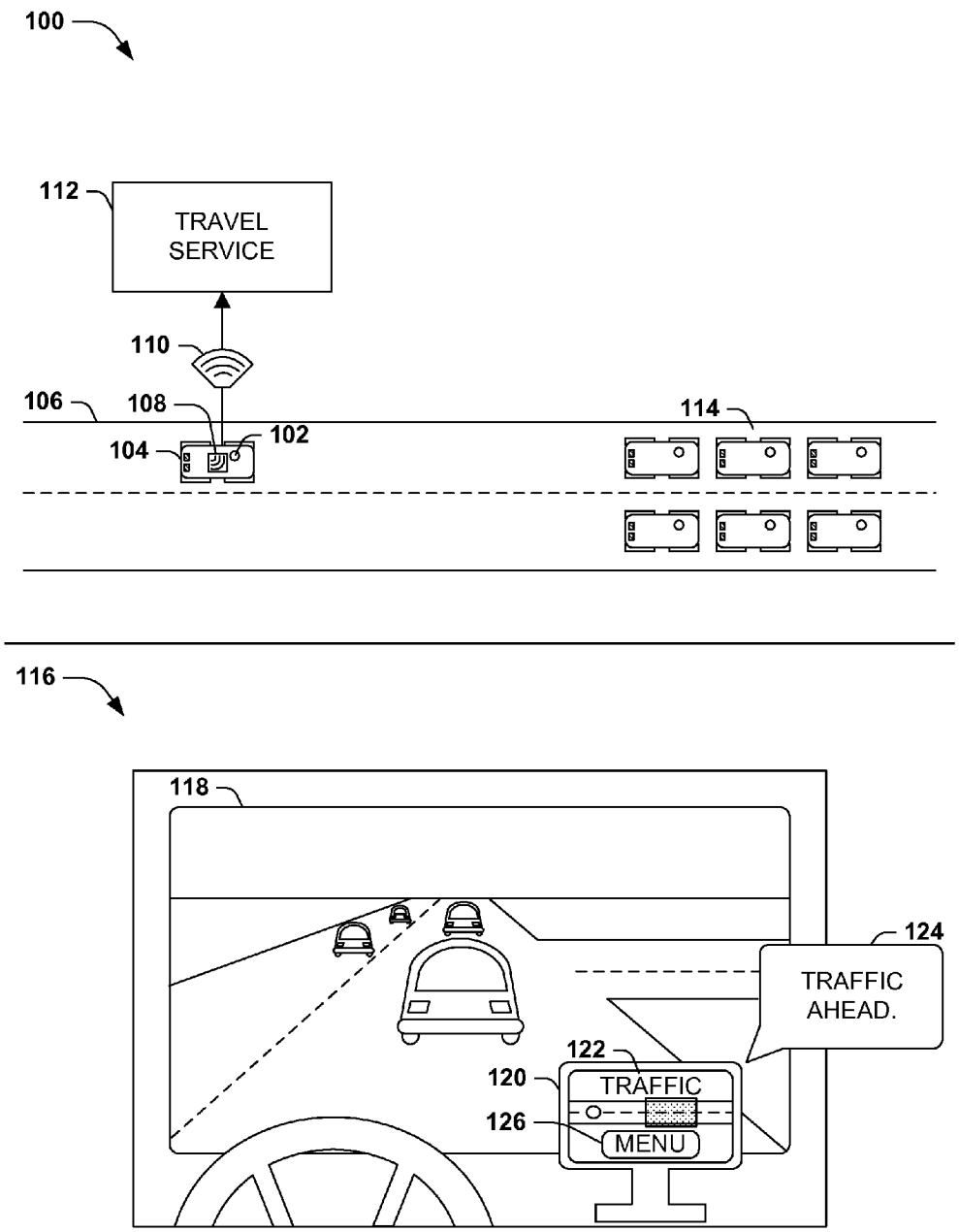
FIG. 1 is an illustration of an exemplary scenario featuring a device presenting a user interface to an individual during the operation of a vehicle.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 presents an illustration of an exemplary scenario featuring an individual 102 operating a vehicle 104 in a travel region 106 viewed through a window 118. In particular, this individual 102 is driving an automobile on a road while viewing the road, other drivers, and the environment through the windshield. The interior 116 of the vehicle 104 of the individual 102 is equipped with a communication device 108 that is in communication 110 with a travel service 112, such as a geopositioning service, a mapping service, a routing service, a vehicle tracking service, a traffic reporting service, or a cellular communication service, and where the communication 110 involves information that is presented to the individual 102 operating the vehicle 104 on a device 120, such as a global positioning system (GPS) receiver having a display that is mounted on a dashboard or console of the vehicle 104 of the individual 102. For example, the device 120 may receive travel information, such as a report of traffic congestion 114 on the road ahead of the individual 102 and may present a graphical and/or textual indicator 122 of the traffic congestion 114. Additionally, the device 120 may issue spoken output 124 (e.g., a text-to-speech component may speak the report to the individual 102), and may also receive user input through various mechanisms, such as speech recognition and a visual control 126 presented on a touch-sensitive display of the device 120.

In many such scenarios, the manner of presenting information to the individual 102 during the operation of the vehicle 104 may be complicated or problematic, due in significant part to the split attention of the individual 102 between the device 120 and viewing the travel region 106 through the window 118. As a first example, the physical positioning of the device 120 within the vehicle 104 may obscure the view of the individual 102 through the window 118 while operating the vehicle 104. In order to alleviate such obscuring, such devices 120 are often physically located at a periphery of the view of the individual 102, such as mounted on or integrated with a dashboard or console of the vehicle 104, where the individual 102 may be able to view the device 120 using peripheral vision, or a momentary glance away from the window 118 and toward the device 120. However, the peripheral position of the device 120 within the interior 116 of the vehicle 104 may significantly distract the attention of the individual 102; e.g., if positioned far to the periphery, the device 120 may be unable to be viewed with peripheral vision, and also the individual 102 may not also be able to view through the window 118 with peripheral vision while glancing at the device 120. This distraction may slow the reflexes of the individual 102 and pose a potentially dangerous distraction. Conversely, the peripheral positioning of the device 120 in the interior 116 of the vehicle 104 may render the individual 102 unable to view the device 120 at a significant moment (e.g., the device 120 may display a significant visual while the individual 102 is watching an urgent development through the window 118), and the individual 102 may therefore miss some travel information provided by the device 120. As a third example, the device 120 may comprise a touch-sensitive visual indicator 126 that the individual 102 may touch to provide user input to the device, but the positioning of the device 120 within the interior 116 of the vehicle 104 may make the device 126 inconvenient to touch, particularly while operating the vehicle 104, and therefore the individual 102 may be unable to interact with the device 120 at a significant moment. As a fourth example, the device 120 may present visual depictions of objects that are visible through the window 118, but it may be difficult for the individual 102 to correlate the visual depictions and the viewable objects (e.g., the device 120 may display a map with a route including a nearby road, but the individual 102 may have difficulty determining which of several nearby roads the device 120 indicates). These and other disadvantages may arise from the positioning of the device 120 peripheral to the window 118 through which the individual 102 is operating the vehicle 104.

B. Presented Techniques

Presented herein are techniques for providing user interfaces that may facilitate an individual 102 in the operation of a vehicle 104. In accordance with these techniques, a user interface may be integrated with the window 118 through which the individual 102 views the travel region 106 while operating the vehicle 104. As a first example, the window 118 may comprise a windshield of an automobile, motorcycle, boat, or airplane. As a second example, the window 118 may comprise eyewear worn by the individual 102 through which the travel region 106 is viewed. In these and other scenarios, the window 118 may present elements of a user interface that present visuals representing travel information received from a service, such as visual indicators of routes, traffic congestion, road hazards, locations, status information about the vehicle 104, and other vehicles. Notably, such visuals may be presented on a primary area of the window 118 through which the individuals 102 views the travel region 106 to operate the vehicle 104, such as indicators that highlight and annotate a road and the vehicles traveling thereon. Alternatively or additionally, the presentation may be located in a peripheral portion of the window 118, such as near the top of the window 118 where relevant driving information is not often viewable. While legitimate concerns exist that some such embodiments may obscure the vision of the individual 102 through the window 118, other embodiments may facilitate the view of travel region 106 by individual 102 through the window 118, and that such presentation may be safer and more helpful than presenting such information peripheral to the window 118, such as a dash-mounted device 120 that takes the individual's gaze away from the road. Additionally, the window-presented user interface may enable interaction with the individual 102 for the selection of elements and the indication of information.

Figure 2:
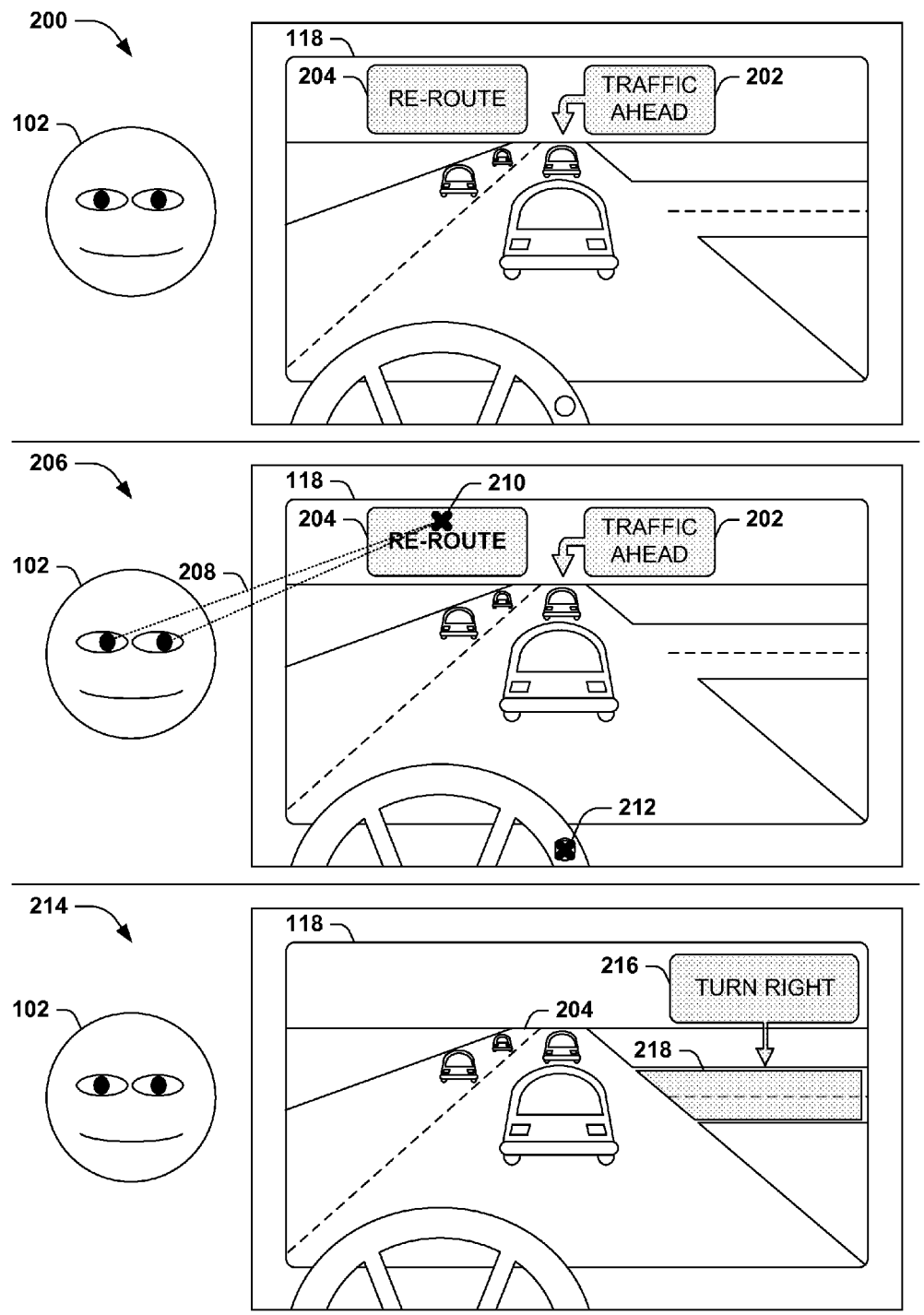
FIG. 2 is an illustration of an exemplary scenario featuring an individual operating a vehicle through a window upon which a user interface is presented in accordance with the techniques presented herein.

FIG. 2 presents an illustration of an exemplary scenario featuring an window-presented user interface provided to facilitate an individual 102 in the operation of a vehicle 104. In this exemplary scenario (presented from the interior 118 as a view through the window 118 of the vehicle 104), at a first time 200, a device of the individual 102 may receive from a travel service 112 some travel information indicating traffic congestion on the road ahead of the individual 102. Accordingly, the device may present on the window 118 of the vehicle 104 a first visual 202 of the travel information. The first visual 202 may be presented in a periphery of the window 118 (e.g., an upper portion of the window 118, where the view of the individual 102 does not include relevant information for operating the vehicle 104), and may indicate through a pointer an area of the travel region 106 to which the first visual 202 applies. The device may also present a second visual 204 representing a visual control that the individual 102 may select in relation to the first visual 202. At a second time 206, the individual 102 may direct his or her eye gaze 208 at the second visual 204. The device 120 may track the eye gaze 208 of the individual 102, and may interpret the eye gaze 208 directed at the second visual 204 as a selection 210 of the second visual 204. However, the device 120 may be further configured to confirm the selection 210 through a different user interface mechanism to confirm the selection 210, such as a button positioned on a manual control of the vehicle 104 (e.g., mounted at a thumb position on the steering wheel), and in the interim may highlight the second visual 204 to indicate the provisional selection. Upon the device 120 may detect an activation 214 of the button, and may interpret such activation 212 as a verification of the intent of the user 104 to select the second visual 204, and may therefore contact the travel service 112 to request an alternative route that avoids the traffic congestion. At a third time 214, upon receiving such supplemental information from the travel service, the device 120 may present a third visual 216 indicating the new route, and a fourth visual 218 aligned with and highlighting a visible object representing the supplemental information. In this manner, the device 120 may provide a window-presented, interactive user interface to the individual 104 to facilitate the operation of the vehicle 104 in accordance with the techniques presented herein.

C. Exemplary Embodiments

Figure 3:
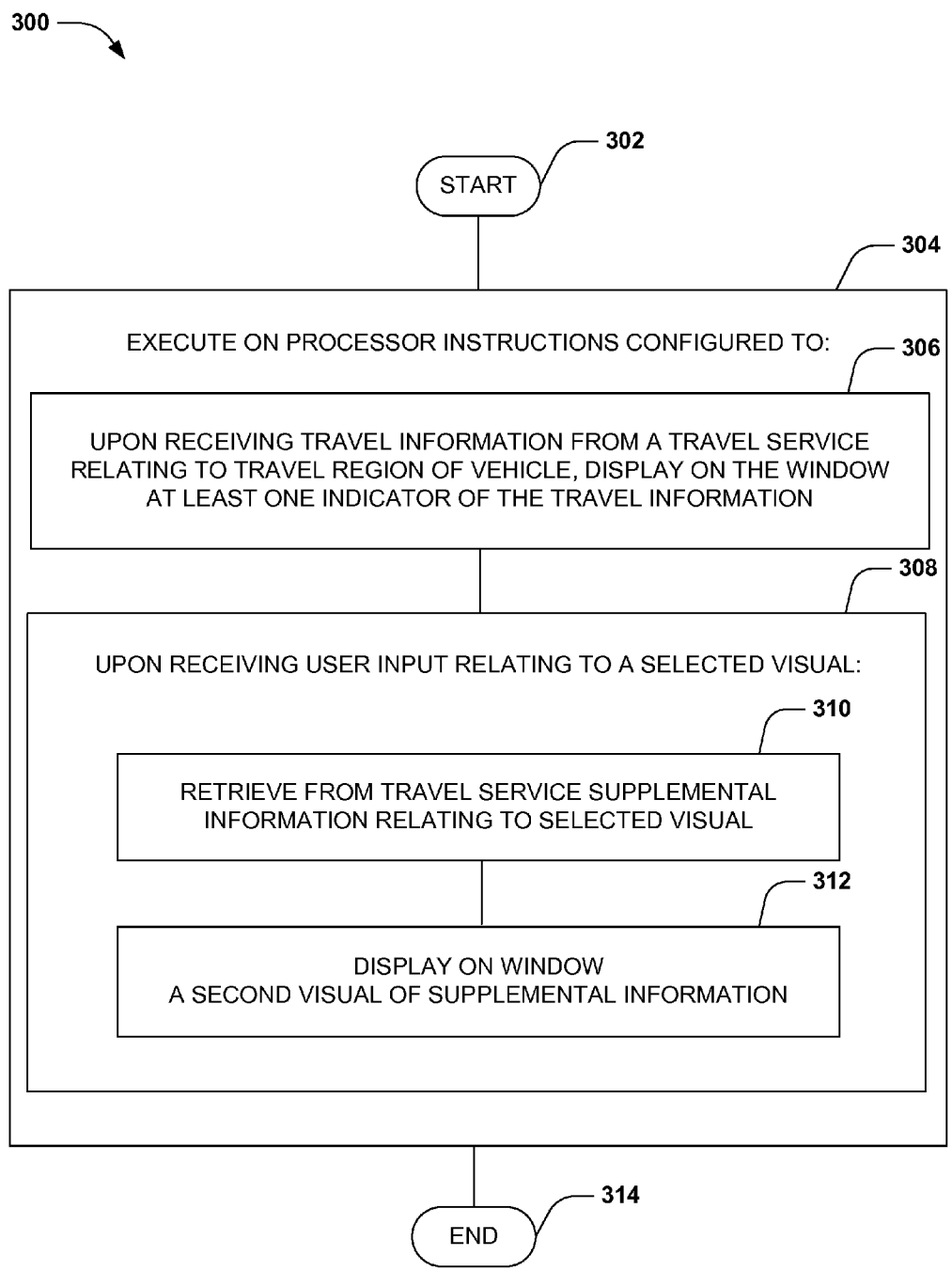
FIG. 3 is a flow diagram illustrating an exemplary method of facilitating an individual operating a vehicle in accordance with the techniques presented herein.

FIG. 3 presents a first exemplary embodiment of the techniques presented herein, illustrated as an exemplary method 300 of facilitating a user 102 in the operation of a vehicle 104 while looking through a window 118. The exemplary method 300 may involve a device having a processor may be implemented, e.g., as a set of instructions stored in a memory component of a device (e.g., a memory circuit, a platter of a hard disk drive, a solid-state memory component, or a magnetic or optical disc) that, when executed by the processor of the device, cause the device to perform the techniques presented herein. The exemplary method 300 begins at 302 and involves executing 304 the instructions on the processor. Specifically, the instructions are configured to, upon receiving travel information from a travel service 112 relating to a travel region 106 of the vehicle 104, display 306 on the window 116 at least one visual 202 of the travel information. The instructions are also configured to, upon receiving 308 user input relating to a selected visual 202, retrieve 310 from the travel service 112 supplemental information relating to the selected visual, and display 312 on the window 116 a second visual of the supplemental information. Having presented visuals 202 on the window 118 for the individual 102 that comprise an interactive user interface including the travel information provided by the travel service 112, the exemplary method 300 achieves the facilitation of the individual 102 in operating the vehicle 104 in accordance with the techniques presented herein, and so ends at 314.

Figure 4:
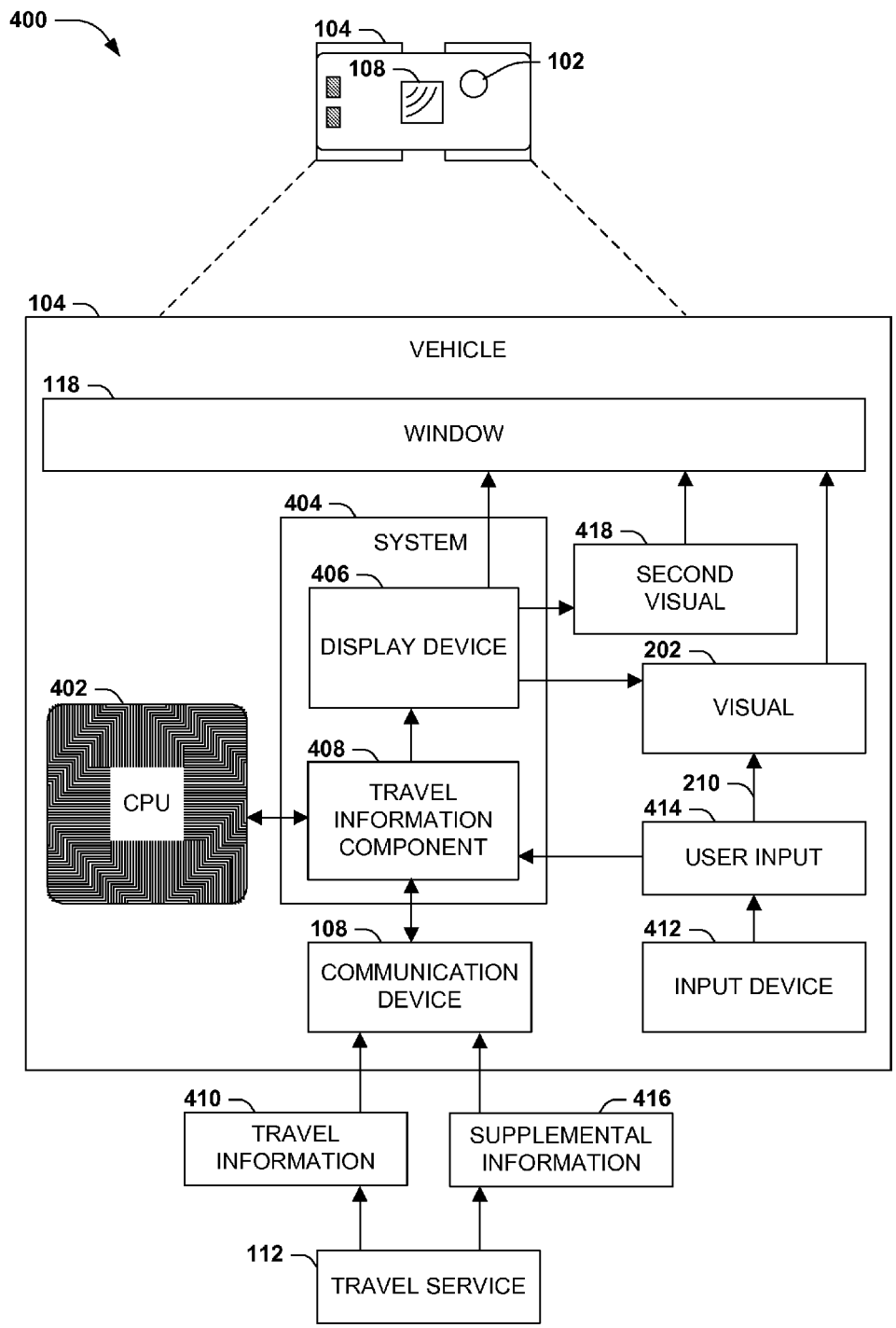
FIG. 4 is a component block diagram of an exemplary system for facilitating an individual operating a vehicle in accordance with the techniques presented herein.

FIG. 4 presents an illustration of an exemplary scenario 400 featuring a second exemplary embodiment of the techniques presented herein, illustrated as an exemplary system 404 for facilitating an individual 102 in the operation of a vehicle 104 while looking through a window 118. The exemplary system 404 may be implemented, e.g., on a device 120 having a processor 402, and may be integrated with the vehicle 104, as a portable or mounted device 120 within the vehicle 104, and/or as a wearable device of the individual 102, or a combination thereof. Additionally, respective components of the exemplary system 404 may be implemented, e.g., as a set of instructions stored in a memory of the device 120 and executable on the processor 402 of the device 120, such that the interoperation of the components causes the device 120 to operate according to the techniques presented herein. The exemplary system 404 comprises a display device 406 that is coupled with the window 118 (e.g., a projector oriented to project images on the window 118, or a liquid crystal display (LCD) embedded in the window 118). The exemplary system 404 also comprises a travel information component 408, comprising instructions that, when executed on the processor 402, upon receiving travel information 410 from a travel service 112 relating to a travel region 106 of the vehicle 104 (e.g., by communicating with the travel service 112 through a communication device 108, such as a cellular transceiver, a traffic data receiver, or a WiFi network connection), instruct the display device 406 to display on the window 118 at least one visual 202 of the travel information 410. The travel information component 408 upon receiving from an input device 412 (e.g., a manual control or a gaze tracking device) user input 414 representing a selection 210 of a selected visual 202, retrieve from the travel service 112 supplemental information 416 relating to the selected visual 202, and instruct the display device 406 to display on the window 118 a second visual 418 of the supplemental information 416. In this manner, the exemplary system 404 presents a window-based user interface on the window 118 of the vehicle 104 in order to facilitate the individual 102 in the operation of the vehicle 104.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
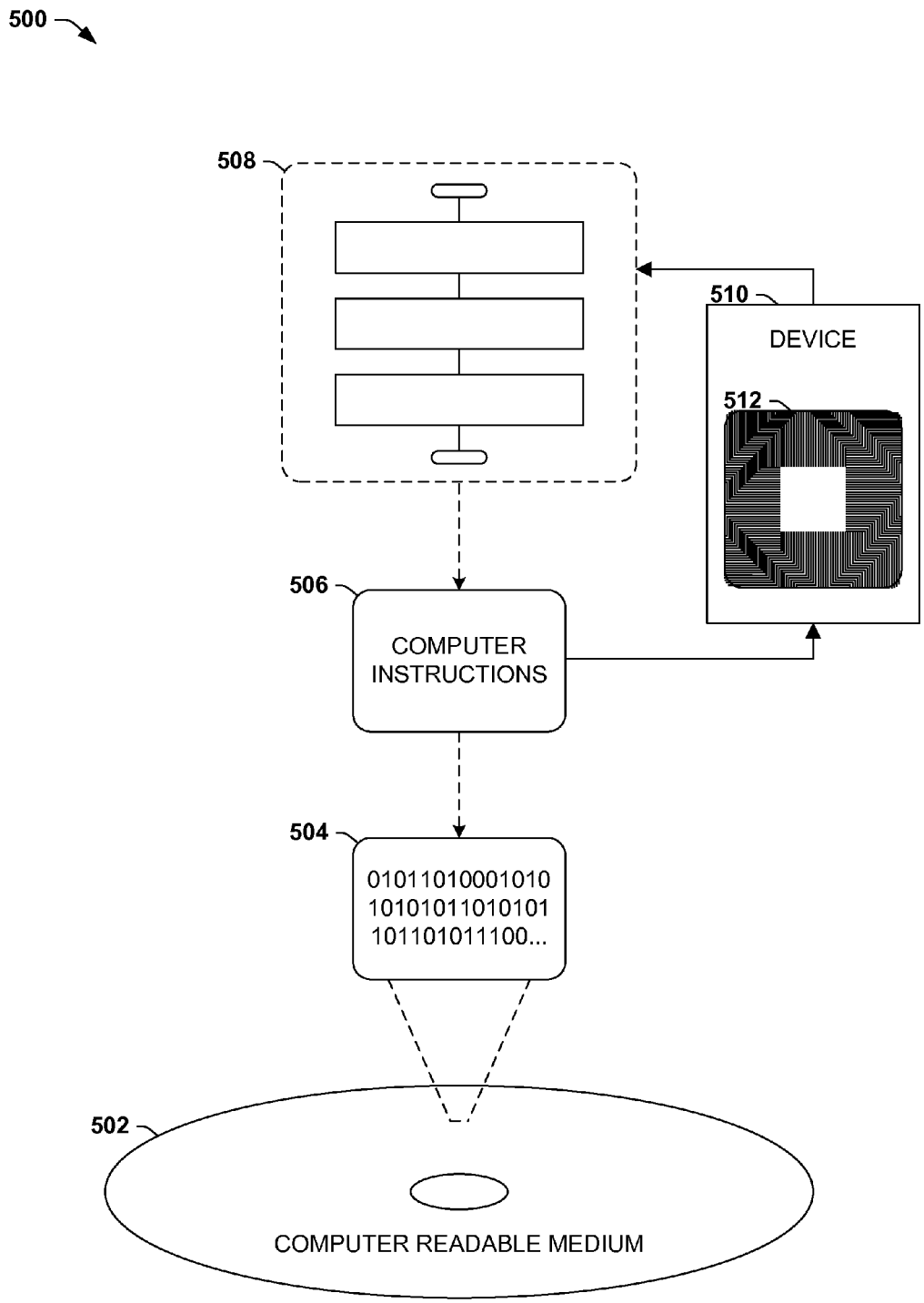
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to the principles set forth herein. In a first such embodiment, the processor-executable instructions 506 may be configured to, when executed by a processor 512 of a device 510, cause the device 510 to perform a method 508 of facilitating an individual 102 in the operation of a vehicle 104, such as the exemplary method 300 of FIG. 3. In a second such embodiment, the processor-executable instructions 506 may be configured to, when executed by a processor 512 of a device 510, cause the device 510 to implement one or more components of a system 404 for facilitating an individual 102 in the operation of a vehicle 104, such as the exemplary system 404 of FIG. 4. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variable Aspects

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3, and/or; and the exemplary system 404 of FIG. 4) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized in many types of vehicles 104 operating in many types of travel regions 106, such as automobiles driven on a roadway; watercraft operated on a waterway; aircraft operated in an airspace; trains operated on a railway; trucks operated in a trucking facility, and construction equipment operated in a construction zone. The techniques may also be applied to various types of individuals 102 in the operation of such vehicles 104 (e.g., pilots, navigators, and operators of supplemental vehicle equipment).

As a second variation of this first aspect, the techniques presented herein may involve many types of visuals 202, travel information 410, and travel services 112. As a first example of this third variation, the visuals 202 may represent many types of travel information 410 received from many types of travel services 112, such as a travel map of a travel region 106; a travel route; a travel route instruction; a traffic congestion location; a road hazard location within the travel region 106; a refueling location; a travel way descriptor, such as traffic control mechanisms (e.g., stop signs, traffic signals, and speed limits) of a travel way; a location of a second vehicle 104; a status indicator of the vehicle 104 (e.g., a fuel level or engine performance characteristic); highlights of travel-related objects, such as vehicles 104 operated by other individual 102 known to the individual 102 (e.g., a second vehicle 104 that the individual 102 is following), and/or other vehicles 104 that are also participating in the travel service 112; and a travel visit suggestion, such as locations of interest within the travel region 106 or along the route of the individual 102. As a second example of this third variation, such information may be received from many types of travel services 112, such as a local data store integrated with the device 120 (e.g., a locally stored map and routing database); a traffic congestion broadcast, such as a Traffic Information Service Broadcast (TIS-B); and a remotely accessible map or routing service, such as a cloud-based mapping service. As a third example of this third variation, an embodiment of these techniques may communicate with the travel service 112 in many ways, such as a direct electronic connection (e.g., a wired connection to a data storage device or a second data processing device); a local networking interface, such as a Bluetooth, WiFi, radio broadcast, or infrared transmission; a short-range communication protocol, such as an area-based WiFi network, short-range radio broadcast, or a cellular network; or an uplink through any such connection (including a communication device 108) to a remotely accessible travel service 112, such as a cloud-based travel service 112. As a fourth example of this third variation, Additionally, many types of visuals may be displayed on the window 118 to represent the travel information 410, such as text, colored shapes, icons, two- or three-dimensional graphics, and highlighted regions of the window 118. Many such variations may apply to scenarios in which the techniques presented herein may be effectively utilized.

D2. Device and Component Architecture and Interoperation

A second aspect that may vary among embodiments of these techniques involves the types and architectures of the devices 120 and components, and the interoperation thereamong, that may implement variations of the techniques presented herein.

As a first variation of this second aspect, the device 120 may vary with respect to the vehicle 104. As a first such example, be integrated with the vehicle 104, such as an in-dash navigation system. As a second such example, the device 120 may comprise a portable device, such as a mobile phone, tablet, laptop, or portable global positioning system (GPS) receiver that is temporarily and/or releasably positioned or used within the vehicle 104. As a third such example, the device 120 may implemented in a wearable computer, such as eyewear (e.g., glasses, goggles, helmets, or headsets), fabric-integrated computing devices, wristwatches, and embedded biological devices.

As a second variation of this second aspect, the device 120 may involve an interaction of two or more devices to implement the techniques presented herein. As a first such example, the device 120 may include a geopositioning device configured to identify a location of the vehicle 104 for transmission to the travel service 112, or may receive the location from another geopositioning device within or outside the vehicle 104. As a second such example, the device 120 may incorporate a communication device 108 that is in communication 110 with the travel service 112, or may interact with a communication device 108 embedded in the vehicle 104 (e.g., an on-board cellular uplink). As a third such example, the individual 102 may utilize a second device comprising an output component (e.g., a wristwatch that interacts with the device 120 and provides tactile feedback), and the device 120 may interact with the individual 102, supplemental to the displaying of information on the window 116, by sending the travel information to the second device for presentation by the output component to the individual 102.

As a third variation of this second aspect, the techniques may involve the presentation of the visuals 202 comprising the user interface on many types of windows 118. As a first such example, the window 118 may comprise a window mounted in the vehicle 104, such as a windshield or porthole. As a second such example, the window 118 may comprise eyewear worn by the individual 102 while operating the vehicle 104, such as a pair of glasses or goggles. Additionally, the visuals 202 may be displayed on the window 118 in various ways, such as a projector device configured to project the visuals 202 onto the window 118, or a liquid crystal display integrated with the window 118.

As a fourth variation of this second aspect, many types of output devices may be included to supplement the displaying of visuals 202 on the window 118. For example, such output devices may include speakers configured to generate voice or sound output; visual output presented on a second display component not involving the window 118, such as light emitting diodes (LEDs) and/or liquid crystal displays (LCDs) integrated with a dash or console of the vehicle 104 or a second device 120; tactile feedback, such as audible or tangible click mechanisms on dials in response to manipulation; and vibration or heat feedback.

As a fifth variation of this second aspect, the techniques may involve the receipt of user input 414 received through many types of input devices 412.

As a first example of this fifth variation, the user input 414 may comprise voice input, and the input device 412 may comprise a microphone coupled with a speech recognizer, that receives voice commands from the individual 102.

As a second example of this fourth variation, the user input 414 may comprise manipulation of a physical control, and the input device 412 may comprise a button, switch, dial, or pedal that is positioned within the vehicle 104 near a hand or foot of the individual 102.

As a third example of this fifth variation, the user input 414 may comprise touch input, and the input device 412 may comprise a touch-sensitive display that detects contact from a fingertip of the individual 102.

As a fourth example of this fifth variation, the user input 414 may comprise one or more gestures performed by the individual 102 (e.g., hand signals, pointing with a finger, or sign language), and the input device 412 may comprise a gesture detector that is configured to monitor the individual 102 to detect gestures, and upon detecting a gesture, translate the gesture into user input 414 associated with the selected visual. For example, the gesture detector may comprise a camera coupled with a machine vision algorithm, and/or at least one accelerometer worn on an appendage of the individual 102 (e.g., a wristwatch) and configured to monitor acceleration of the accelerometer to detect the gesture of the appendage of the individual 102.

As a fifth example of this fifth variation, the user input 414 may comprise eye gaze of the individual 102 involving a gaze position through the window 118, and the input device 412 may comprise a gaze detector configured to monitor the eye gaze of the individual 102, and upon detecting a gaze position through the window 118, translate the gaze position into user input 414 associated with the selected visual. Additionally, the eye gaze of the individual 102 further comprising a focal depth (e.g., detected according to the distance between the pupils of the individual's eyes, where shorter distances indicate a closer focal depth and longer distances indicate a more distant focal depth), and the gaze detector may be further configured to monitor the focal depth of the eye gaze of the individual 102 and, upon detecting the focal depth of the eye gaze on the window 118, translate the gaze position into user input 414 associated with the selected visual. That is, the gaze detector may only correlate the gaze of the individual 102 with user input 414 if the focal depth of the individual's eye gaze is approximately focused on the visual 202 presented on the window 118.

As a sixth variation of this fifth aspect, user input 414 may be directed by the user 102 at a second computing device, such as a mobile phone, tablet, laptop, or wearable computer, or an input device 412 attached thereto, such as a keyboard or mouse, and may be transmitted to the device 120 by the second computing device.

As a seventh variation of this fifth aspect, the device 120 may interact with a second device 120 of the individual 102 to receive user input 414, and may handle such user input 414 differently depending on the input device 412 through which the user input 414 was received. For example, as illustrated in the exemplary scenario 200 of FIG. 2, the user interface may utilize the gaze of the individual 102 to detect a selection 210 of visuals 202 on the window 118, but may treat such selection as provisional until receiving an activation 214 of a button.

Figure 6:
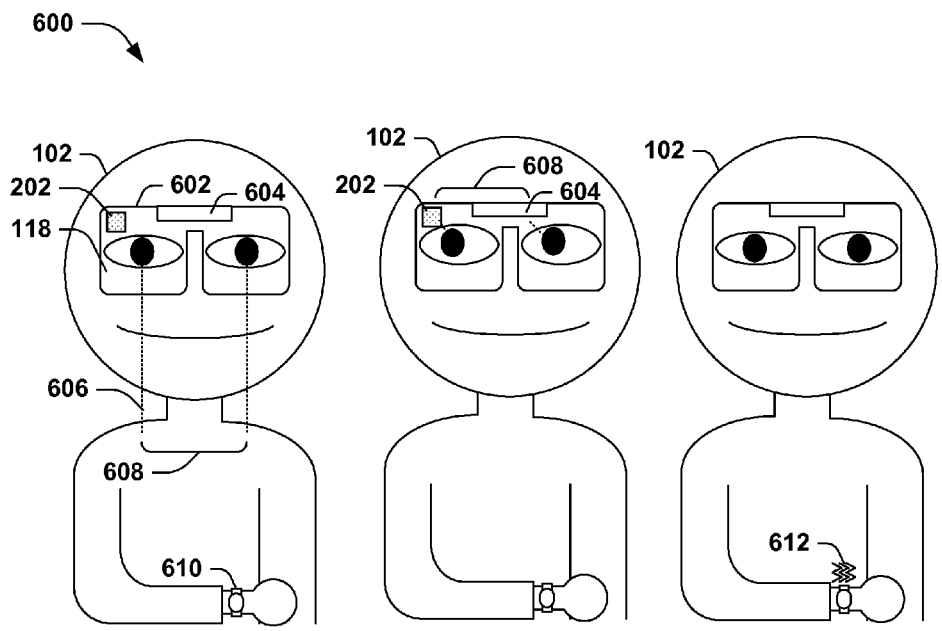
FIG. 6 is an illustration of an exemplary scenario featuring a user interface embedded in a window comprising lenses of wearable glasses operably coupled with a wristwatch.

FIG. 6 presents an illustration of an exemplary scenario 600 featuring one such user interface for facilitating an individual 102 in the operation of a vehicle 104, wherein the window 118 is integrated into eyewear 602 worn by the individual 102, and upon which one or more visuals 202 may be displayed to present the travel information 410 received from the travel service 112. In this exemplary scenario 600, the eyewear 602 further comprises a gaze detector 604, such as a camera that monitors the positions of the individual's pupils to determine the location of the gaze 606 of the individual 102. Additionally, the gaze detector 604 may monitor a pupil distance 608 between the individual's pupils to indicate the focal depth of the individual's gaze, such that a short pupil distance 608 indicates that the individual 102 is focusing on the surface of the eyewear 602, and a longer pupil distance 608 indicates that the individual 102 is looking through the eyewear 602. Accordingly, when the user 102 is looking through the eyewear 602, the gaze detector 604 may disregard the gaze of the individual 102 as providing user input 414; and when the individual 102 is focusing on the surface of the eyewear 602 and directing the gaze 606 near a visual 202, the eyewear 602 may construe the gaze 602 as visual input. Additionally, the eyewear 602 may communicate with a second device 610 of the individual 102, such as a wristwatch, and may receive user input 414 and/or present supplemental output through the wristwatch (e.g., through vibration output 612). These and other variations in the architecture of the device 120, including the interoperation of many such devices 120 and/or components, may be devised by those having ordinary skill in the art while implementing the techniques presented herein.

D3. User Interfaces

A third aspect that may vary among embodiments of the techniques presented herein relates to the presentation of the visuals 202 comprising the window-oriented user interface, and the interaction of the individual 102 with the user interface presented on the window 118.

As a first variation of this third aspect, the visuals 202 may or may not relate to objects that are currently viewable through the window 118.

As a first example of this first variation, at least one travel visual 202 may be associated with an object that is viewable through the window at an object position, and the visual 202 may be displayed on the window 118 at a visual position related to the object position of the object (e.g., above, below, or pointing to the object).

As a second example of this first variation, the visual 202 may be displayed on the window 118 at a visual position that is aligned with the visual with the object viewable through the window 118, such as a highlight applied to the object viewable through the window 118.

As a third example of this first variation, at least one visual 202 may be associated with an object that is not viewable through the window 118, such as a traffic control signal (e.g., a street sign, stop sign, or traffic light) that is missing, defective, or currently obscured by another vehicle 104 or a road hazard. This visual 202 may therefore fill in significant missing detail that may promote the safety and information of the operation of the vehicle 104 by the individual 102.

As a fourth example of this first variation, at least one visual 202 may be displayed peripherally on the window 118. For example, the window 118 may present to the individual 102 a primary viewing area associated with operation of the vehicle 104 by the individual 102 (e.g., a forward view of the road ahead, the other vehicles 104 near the vehicle 102, and traffic control signs), and also a peripheral viewing area that is not associated with operation of the vehicle 104 by the individual 102 (e.g., an upper portion of the window 118 through which only the sky is typically viewable), and the device 120 may display at least one visual 202 in the peripheral viewing area of the window 118. Such peripherally displayed visuals 202 may be positioned adjacent to and may point toward relevant information viewable in the primary viewing area, and/or may simply be presented at an edge of the window 118. Additionally, different types of information may be presented at different locations on the window 118 (e.g., urgent travel information relating to objects viewable in the primary viewing area of the window 118 may be presented as visuals 202 in the primary viewing area of the window 118, while less urgent travel information, and information that does not relate to objects viewable in the primary viewing area of the window 118, such as fuel status, may be presented in the peripheral viewing area of the window 118). For example, in the exemplary scenario 200 of FIG. 2, routing instructions are presented in the upper (peripheral) portion of the window 118, but may point to objects (such as roads) viewable in the primary viewing area, and viewable objects related to the travel information (such as roads involved in a travel route) may be applied by visuals 202 presented in the primary viewing area.

As a second variation of this third aspect, the user input of the individual 102 may be transmitted to the travel service 112, e.g., as a recording of the travel of the individual 102, and/or to verify, update, correct, and/or supplement the travel information 410 provided by the travel service 112. For example, the user input 414 from the individual 102 may describe one or more travel region properties of the travel region 106 of the individual 102, and the device 120 may be further configured to send the at travel region properties to the travel service 112.

Figure 7:
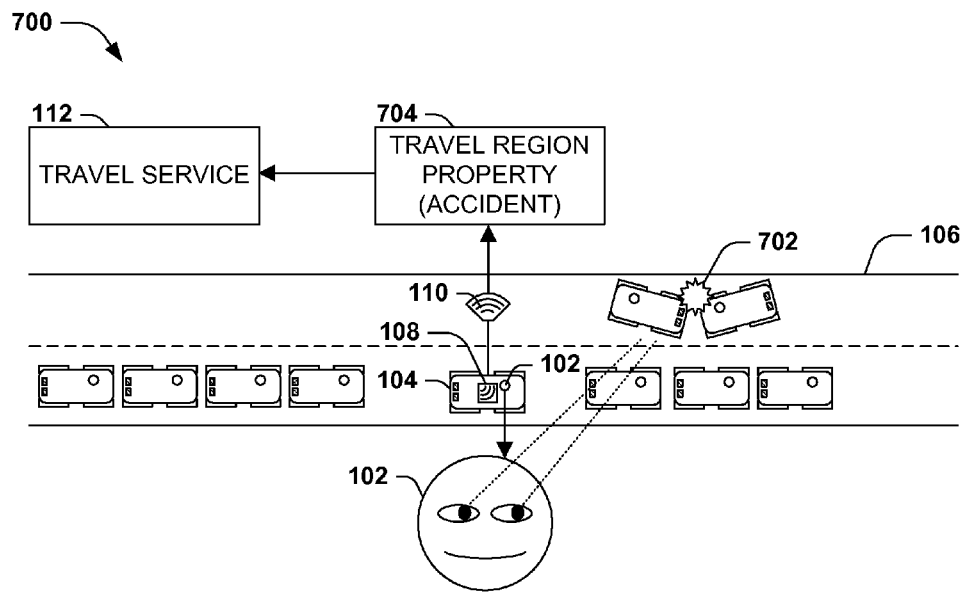
FIG. 7 is an illustration of an exemplary scenario featuring an individual-assisted transmission of information about a travel region to a travel service.

FIG. 7 presents an illustration of an exemplary scenario 700 featuring a transmission of a travel region property 704 to the travel service 112 to update the travel service 112. In this exemplary scenario 700, an individual 102 operating a vehicle 104 in a travel region 106 may view an accident 702, a road hazard, a construction zone, or a discrepancy between the travel region 106 and a map or route of the travel region 106 provided by the travel service 112. The user input 414 from the individual 102 may facilitate the updating of this travel information 410; e.g., when the individual 102 gazes at the accident 702, the location of the user's gaze 102 may be evaluated to detect the location in the travel region 106 where the individual 102 is looking, and a communication device 108 that is in communication 110 with the travel service 112 may transmit a travel region property 704 indicating the target of the individual's gaze. The collection and evaluation of such information from several individuals 102 operating vehicles 104 in the travel region 106 may be used, e.g., to detect a visual distracting object or event, or to detect individual engagement with an advertisement, such as a billboard. These and other techniques may be included in variations of the user interfaces displayed on the window 118 while the individual 102 is operating the vehicle 104 in accordance with the techniques presented herein.

E. Computing Environment

Figure 8:
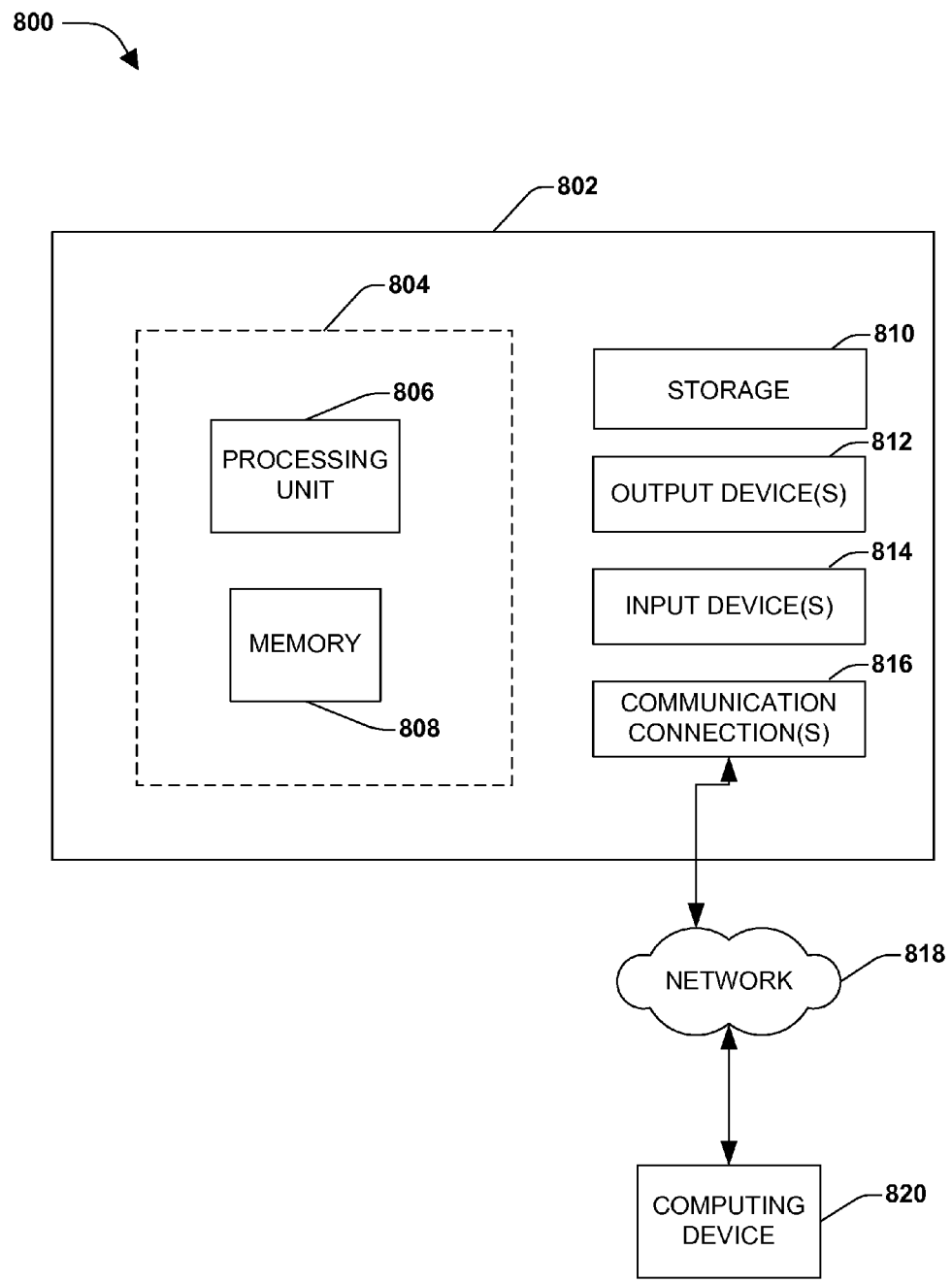
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer readable instructions to implement one or more embodiments provided herein may be in storage 810. Storage 810 may also store other computer readable instructions to implement an operating system, an application program, and the like. Computer readable instructions may be loaded in memory 808 for execution by processing unit 806, for example.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media may be part of device 802.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 802 may be interconnected by a network. For example, memory 808 may be comprised of multiple physical memory units located in different physical locations interconnected by a network.

Those skilled in the art will realize that storage devices utilized to store computer readable instructions may be distributed across a network. For example, a computing device 820 accessible via network 818 may store computer readable instructions to implement one or more embodiments provided herein. Computing device 802 may access computing device 820 and download a part or all of the computer readable instructions for execution. Alternatively, computing device 802 may download pieces of the computer readable instructions, as needed, or some instructions may be executed at computing device 802 and some at computing device 820.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media.

Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for facilitating an individual operating a vehicle while looking through a window, the system comprising:
   a display device coupled with the window; and
   a travel information component comprising instructions that, when executed on a processor:
   upon receiving travel information from a travel service relating to a travel region of the vehicle:

identify an object that is visible through the window, and that relates to the travel information received from the travel service;
identify an object position at which the object is viewable through the window; and
instruct the display device to display on the window:
a visual indicator overlaying the object position at which the object is visible through the window; and
at a second position on the window not overlapping the visual indicator, a travel information visual of the travel information that is associated with the object.

2. The system of claim 1:
the system further comprising a geopositioning device configured to identify a location of the vehicle; and
the travel information component configured to send the location of the vehicle to the travel service.

3. The system of claim 1, the display device comprising a projector device configured to project the display onto the window.

4. The system of claim 1, the display device comprising a liquid crystal display integrated with the window.

5. The system of claim 1, the window comprising eyewear worn by the individual while operating the vehicle.

6. The system of claim 1:
the system comprising: a gesture detector configured to:
monitor the individual to detect gestures; and
upon detecting a gesture, translate the gesture into user input associated with the object.

7. The system of claim 6:
the gesture detector comprising at least one accelerometer worn on an appendage of the individual; and
the gesture detector configured to monitor acceleration of the accelerometer to detect the gesture of the appendage of the individual.

8. The system of claim 1:
the system comprising: a gaze detector configured to:
monitor an eye gaze of the individual; and
upon detecting a gaze position through the window, translate the gaze position into user input associated with the object.

9. The system of claim 7:
the eye gaze of the individual further comprising a focal depth; and
the gaze detector further configured to:
monitor the focal depth of the eye gaze of the individual; and
upon detecting the focal depth of the eye gaze on the window, translate the gaze position into user input associated with the object.

10. A nonvolatile computer-readable storage device comprising instructions that, when executed on a processor of a device, cause the device to facilitate an individual operating a vehicle while looking through a window, by:
upon receiving travel information from a travel service relating to a travel region of the vehicle:
identifying an object that is visible through the window, and that relates to the travel information received from the travel service;
identifying an object position at which the object is visible through the window; and
displaying on the window, overlaying the object position at which the object is visible through the window, a visual indicator of the object; and at a travel information position that is visually associated with the visual indicator, a travel information visual that relates the travel information associated with the object.

11. A method of facilitating an individual operating a vehicle while looking through a window, the method using a device having a processor and comprising:
executing on the device instructions configured to:
upon receiving travel information from a travel service relating to a travel region of the vehicle:
identify an object that is visible through the window, and that relates to the travel information received from the travel service;
identify an object position at which the object is visible through the window; and
display on the window, overlaying the object position at which the object is visible through the window, at least one visual indicator that relates the travel information with the object; and at a travel information position that is visually associated with the visual indicator, a travel information visual that relates the travel information associated with the object.

12. The method of claim 11, the travel information selected from a travel information set comprising:
a travel map of the travel;
a travel route;
a travel route instruction;
a traffic congestion location;
a road hazard location;
a refueling location;
a travel way descriptor;
a status indicator of the vehicle;
a location of a second vehicle; and
a travel visit suggestion.

13. The method of claim 11, displaying the travel information visual associated with the object position comprising:
selecting the travel information position to align the travel information visual with the object position at which the object is visible through the window.

14. The method of claim 13, the visual indicator of the object further comprising a highlight applied to the object visible through the window.

15. The method of claim 11:
the window presenting to the individual:
a primary viewing area associated with operation of the vehicle by the individual, and
a peripheral viewing area that is not associated with operation of the vehicle by the individual; and
displaying the travel information visual on the window further comprising: displaying the travel information visual on the window in the peripheral viewing area.

16. The method of claim 11:
the individual having a second device comprising an output component; and
the instructions further configured to send the at least one travel information visual of the travel information to the second device for presentation by the output component to the individual.

17. The method of claim 11:
the individual having a second device comprising an input component; and
the instructions further configured to receive from the second device user input received by the input component.

18. The method of claim 11:
user input of the individual describing at least one travel region property of the travel region of the individual; and
the instructions further configured to send the at least one travel region property to the travel service.

* * * * *